United States Patent
Wang et al.

(10) Patent No.: US 8,643,976 B1
(45) Date of Patent: Feb. 4, 2014

(54) METHOD FOR IMPROVED REPEATABLE RUNOUT LEARNING IN A DISK DRIVE

(75) Inventors: Zhi Wang, Irvine, CA (US); Hien T. Chu, Santa Ana, CA (US); Jenghung Chen, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1556 days.

(21) Appl. No.: 11/700,380

(22) Filed: Jan. 31, 2007

(51) Int. Cl.
*G11B 5/596* (2006.01)

(52) U.S. Cl.
USPC ........................................ 360/77.04

(58) Field of Classification Search
None
See application file for complete search history.

(56) References Cited

U.S. PATENT DOCUMENTS

| | | | |
|---|---|---|---|
| 5,949,605 A | 9/1999 | Lee et al. | |
| 6,069,764 A | 5/2000 | Morris et al. | |
| 6,141,175 A | 10/2000 | Nazarian et al. | |
| 6,310,742 B1 | 10/2001 | Nazarian et al. | |
| 6,437,936 B1 | 8/2002 | Chen et al. | |
| 6,449,116 B2 | 9/2002 | Morris et al. | |
| 6,519,108 B2 | 2/2003 | Au et al. | |
| 6,549,362 B1 | 4/2003 | Melrose et al. | |
| 6,556,371 B1 | 4/2003 | Ottesen et al. | |
| 6,563,663 B1 | 5/2003 | Bi et al. | |
| 6,587,302 B2 | 7/2003 | Ahn | |
| 6,650,499 B1 | 11/2003 | Kusumoto | |
| 6,678,108 B2 | 1/2004 | Smith et al. | |
| 6,826,006 B1 | 11/2004 | Melkote et al. | |
| 6,898,047 B2 | 5/2005 | Shishida et al. | |
| 6,924,959 B1 | 8/2005 | Melkote et al. | |
| 6,937,420 B1 | 8/2005 | McNab et al. | |
| 6,937,424 B2 | 8/2005 | Chang et al. | |
| 6,975,480 B1 | 12/2005 | Codilian et al. | |
| 6,999,267 B1 | 2/2006 | Melkote et al. | |
| 7,046,477 B2 | 5/2006 | Shibata | |
| 7,088,547 B1 | 8/2006 | Wang et al. | |
| 7,106,547 B1 | 9/2006 | Hargarten et al. | |
| 7,139,149 B1 | 11/2006 | Sun et al. | |
| 7,196,864 B1 | 3/2007 | Yi et al. | |
| 7,304,819 B1 | 12/2007 | Melkote et al. | |
| 7,423,834 B1 | 9/2008 | Sun et al. | |
| 7,450,336 B1 | 11/2008 | Wang et al. | |
| 7,576,941 B1 | 8/2009 | Chen et al. | |
| 7,583,470 B1 | 9/2009 | Chen et al. | |
| 7,764,459 B2 | 7/2010 | Cho | |
| 7,894,156 B2 | 2/2011 | Ehrlich et al. | |
| 2003/0123180 A1 | 7/2003 | Settje et al. | |
| 2004/0246619 A1* | 12/2004 | Zhang ...................... | 360/77.04 |
| 2007/0297088 A1* | 12/2007 | Sun et al. .................. | 360/77.04 |

OTHER PUBLICATIONS

U.S. Appl. No. 60/782,909, filed Mar. 15, 2006, 5 pages.

* cited by examiner

*Primary Examiner* — Andrew L Sniezek

(57) ABSTRACT

A method is disclosed for adaptive learning of fundamental-frequency repeatable runout (1FRRO) compensation information in a disk drive. The disk drive includes a transducer head, a magnetic disk having a plurality of concentric data tracks defined by embedded servo wedges that provide position information, and a control system. In the method, 1FRRO compensation information is learned over a predetermined minimum number of disk revolutions. After the predetermined minimum number of disk revolutions, the 1FRRO compensation information is monitored for convergence while learning of the 1FRRO compensation information continues. Learning is terminated upon detection of convergence of the 1FRRO compensation information.

22 Claims, 5 Drawing Sheets

IDEAL SERVO TRACKS

WRITTEN SERVO TRACKS

METHOD FOR IMPROVED REPEATABLE RUNOUT LEARNING IN A DISK DRIVE

BACKGROUND OF THE INVENTION

1. Field of the Invention

The present invention relates to disk drives for computer systems. More particularly, the present invention relates to techniques for efficiently determining repeatable runout (RRO) in a disk drive.

2. Description of the Prior Art

With reference to FIGS. 6A and 6B, repeatable runout (RRO) in a disk drive is a disturbance in the servo system which can degrade performance by disrupting the head's centerline tracking during read and write operations. The RRO disturbance, compared with a perfectly centered and circular data track, is typically caused by physical imperfections in the disk drive such as spindle motor runout, disk slippage, disk warping, media defects, and imperfections in the electromechanical servoing mechanism including the mechanism for writing embedded servo sectors onto the disk during manufacturing. Because the imperfections that cause RRO are relatively static, RRO is a predictable disturbance that is periodic with the rotation of the disk. It is known in the industry to estimate and cancel out the periodic RRO disturbance by introducing a feed-forward compensation signal into the servo loop.

The RRO disturbance due to the disk having a non-centric alignment with the spindle motor is sinusoidal with a period equal to the rotation of the disk. This sinusoidal disturbance can be represented as:

$$a*\cos(2\pi k/N)+b*\sin(2\pi k/N)$$

where $\{a,b\}$ are coefficients corresponding to the magnitude of the disturbance (magnitude of the non-centric offset) and k is an index representing one of N servo sectors.

There is, therefore, a need for a fast, efficient technique for learning the RRO disturbance in a disk drive that may be subjected to a physical shock causing disk slippage.

SUMMARY OF THE INVENTION

The present invention may be embodied in a method for adaptive fundamental-frequency repeatable runout (1FRRO) learning in a disk drive to reduce learn time. In the method, 1FRRO compensation information is learned over a predetermined minimum number of disk revolutions. After the predetermined minimum number of disk revolutions, the 1FRRO compensation information is monitored for convergence while learning of the 1FRRO compensation information continues. Learning is terminated upon detection of convergence of the 1FRRO compensation information.

In more detailed features of the invention, the predetermined minimum number of disk revolutions may be equal to or greater than 2, and may be less than 12. For example, the predetermined minimum number of disk revolutions may be equal to 5. The learning may be performed after each disk drive power-on, or after detection of a shock event.

In other more detailed features of the invention, the step of monitoring the 1FRRO compensation information for convergence while continuing learning of the 1FRRO compensation information may comprise at least one disk revolution. The detection of convergence of the 1FRRO compensation information may include initializing convergence monitoring values R and I; updating the convergence monitoring values according to the formulas:

$$R=R+PES*\cos(2\pi i/N)$$

$$I=I+PES*\sin(2\pi i/N)$$

where: i is an index representing one of N servo sectors, and PES is a position error signal; calculating a convergence value according to the formula:

$$DFT=DFT+(R^2+I^2)^{1/2};$$

and comparing the convergence value to a threshold to detect convergence of the 1FRRO compensation information.

In an additional more detailed feature of the invention, the method may further comprise concurrently learning and monitoring harmonic-frequency repeatable runout (nFRRO) compensation information for convergence. Learning of the nFRRO compensation information may be terminated upon detection of convergence of the nFRRO compensation information.

The invention also may be embodied in disk drive having a disk and a control system. The disk has a plurality of concentric data tracks defined by embedded servo wedges, and has some eccentricity exhibiting fundamental frequency runout (1FRRO). The control system is operable to perform the method steps.

The invention also may be embodied in a disk drive with adaptive fundamental-frequency repeatable runout (1FRRO) learning to reduce learn time. The disk drive includes means for learning 1FRRO compensation information over a predetermined minimum number of disk revolutions; means for monitoring, after the predetermined minimum number of disk revolutions, the 1FRRO compensation information for convergence while continuing learning of the 1FRRO compensation information; and means for terminating learning upon detection of convergence of the 1FRRO compensation information.

BRIEF DESCRIPTION OF THE DRAWINGS

The accompanying drawings illustrate embodiments of the present invention and, together with the description, serve to explain the principles of the invention.

DESCRIPTION OF THE PREFERRED EMBODIMENTS

Figure 1:
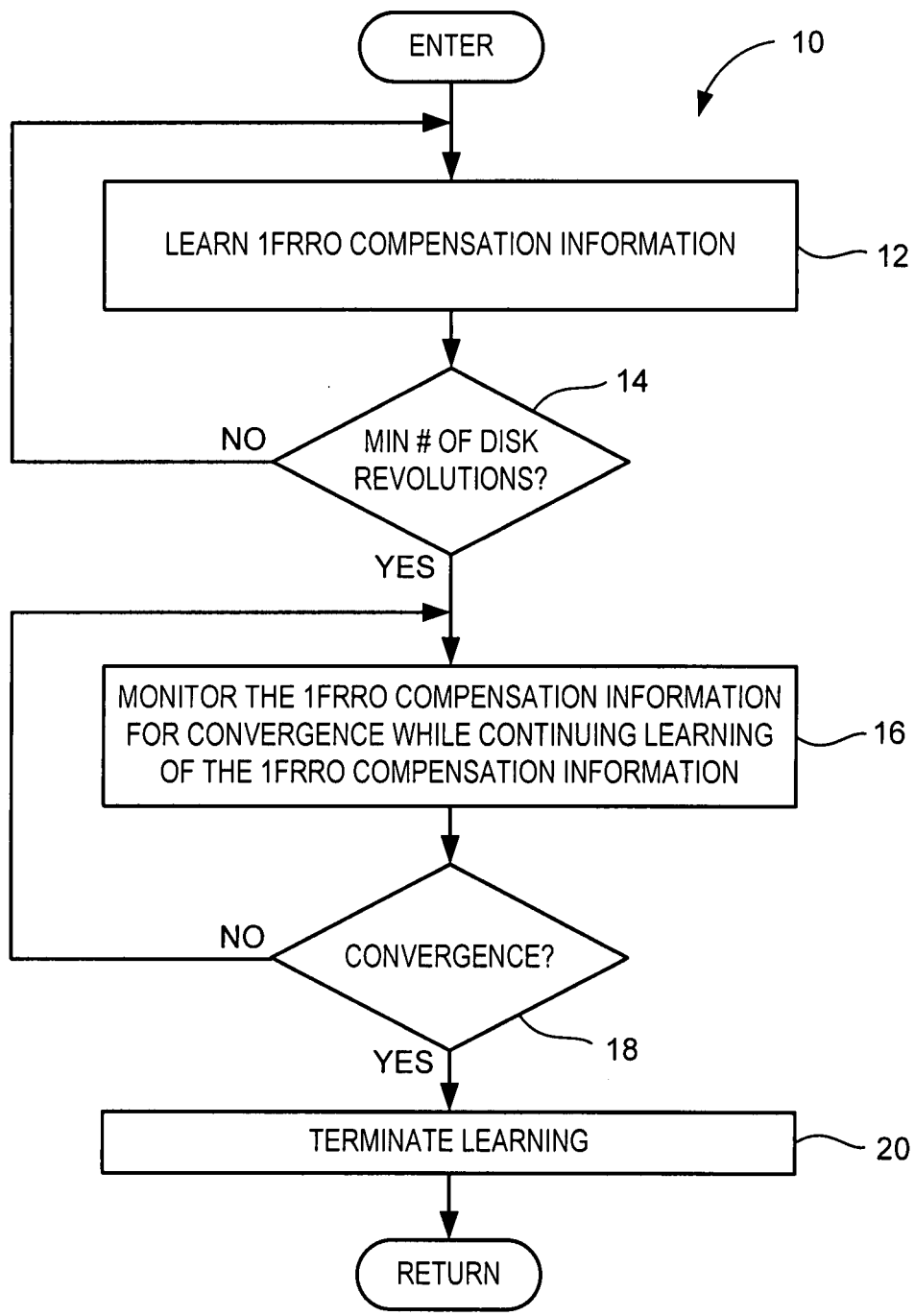
FIG. 1 is a flow diagram illustrating a method for efficiently learning fundamental-frequency repeatable runout (1FRRO) compensation information in a disk drive, according to the present invention.
Figure 2:
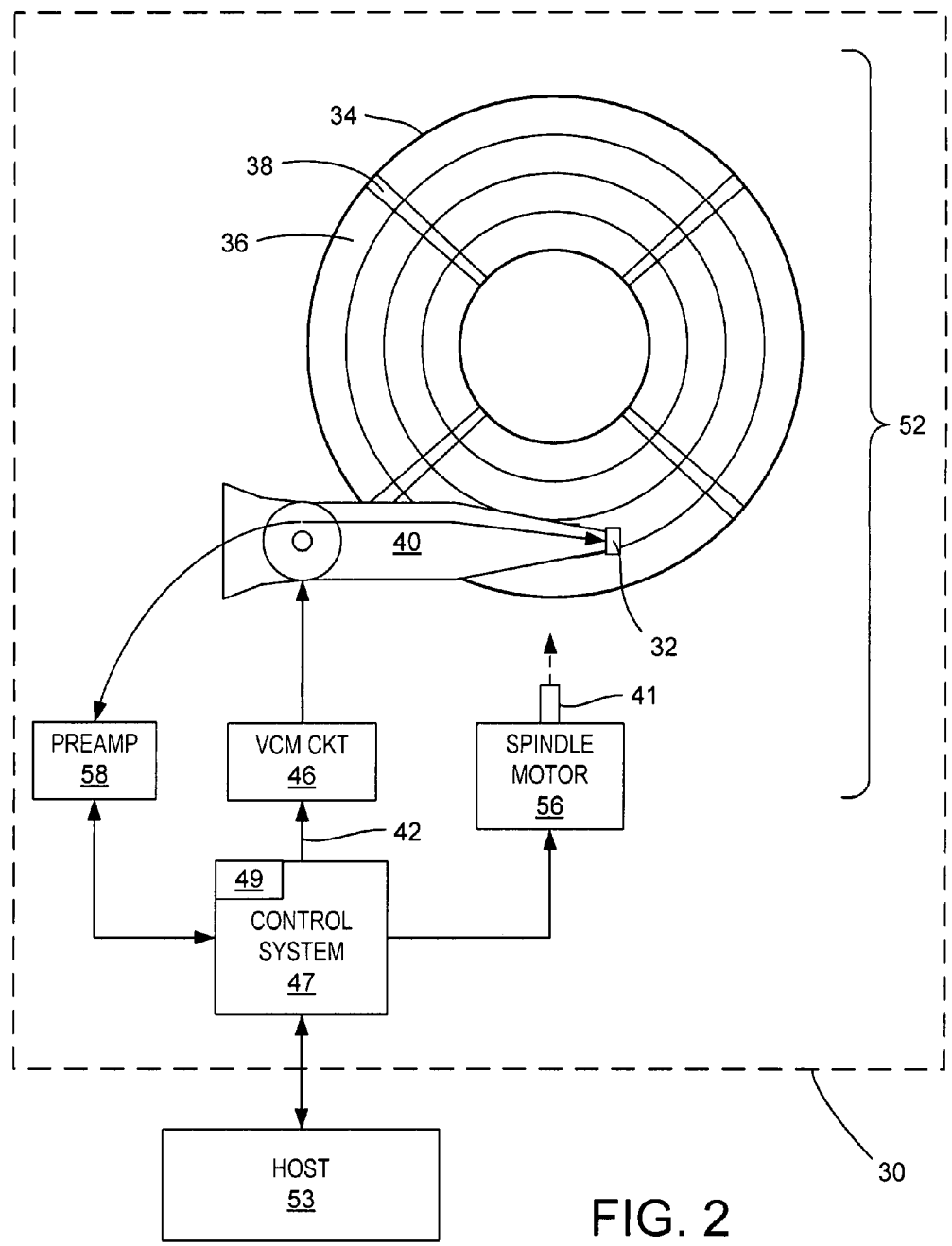
FIG. 2 is a block diagram of a computer system including a disk drive with a control system for implementing the learning method of FIG. 1, according to the present invention.

With reference to FIGS. 1 and 2, the present invention may be embodied in a method 10 (FIG. 1) for adaptive fundamental-frequency repeatable runout (1FRRO) learning in a disk drive 30 (FIG. 2) to reduce learn time. In the method, 1FRRO compensation information is learned (step 12) over a predetermined minimum number of disk revolutions (step 14). After the predetermined minimum number of disk revolutions, the 1FRRO compensation information is monitored for convergence while learning of the 1FRRO compensation information continues (step 16). Upon detection of convergence of the 1FRRO compensation information (step 18), learning is terminated (step 20).

The present invention may be particularly advantageous with smaller form-factor disk drives 30 used in mobile devices which may be subject to shock forces. The shock forces may cause a mechanical slip in the position between a disk hub and the disk 34. The slip may cause a large 1FRRO that acts as a disturbance in the disk drive's servo system. Using the adaptive learning techniques may save learning time because it may reduce the number of disk revolutions required to learn the 1FRRO.

The predetermined minimum number of disk revolutions may be equal to or greater than 2, and may be less than 12. For example, the predetermined minimum number of disk revolutions may be equal to 5. The learning may be performed after each disk drive power-on, or after detection of a shock event.

The monitoring the 1FRRO compensation information for convergence while continuing learning of the 1FRRO compensation information (step 16) may comprise at least one disk revolution. The detection of convergence (step 18) of the 1FRRO compensation information may include initializing convergence monitoring values R and I; updating the convergence monitoring values according to the formula:

$$R=R+PES*\cos(2\pi i/N)$$

$$I=I+PES*\sin(2\pi i/N)$$

where: i is an index representing one of N servo sectors, and PES is a position error signal; calculating a convergence value according to the formula:

$$DFT=DFT+(R^2+I^2)^{1/2};$$

and comparing the convergence value to a threshold to detect convergence of the 1FRRO compensation information.

Figure 3:
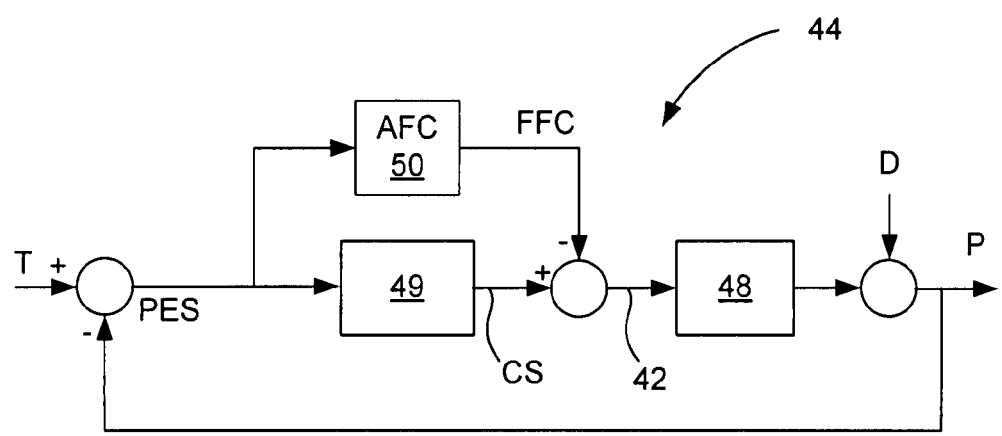
FIG. 3 is a block diagram of a servo control loop having adaptive feed-forward cancellation.

The disk drive may include a transducer head 32, the rotating magnetic disk 34 having a plurality of concentric data tracks 36 defined by embedded servo wedges 38 that provide position information, and an actuator 40 coupled to the head. Eccentricities in the disk between a spindle 41 and the concentric data tracks may be exhibited in the form of the 1FRRO. Adaptive feed-forward cancellation (AFC) may used to cancel repeatable runout (RRO) in the disk drive 30 as shown with reference to the servo control loop 44 in FIG. 3. The actuator 40 includes a voice coil motor (VCM) circuit 46 driven by a control signal 42. The assembly for the head position components is represented by block 48, a track-following compensator is represented by block 49, and the AFC is represented by block 50. The input to the track-following compensator 49 is a position error signal (PES) generated from a difference between a desired position signal T and a measured position signal P. The effect of the RRO disturbance D is cancelled at the input of the VCM by subtracting a feed-forward compensation value FFC, corresponding to the RRO disturbance, from a compensator signal CS. The 1FRRO compensation information may be used in computing the feed-forward compensation values for use in the head-position control servo loop.

The control system 47 of the disk drive 30 (FIG. 2) is operable to generate the control signal to perform the method steps set forth above and shown in FIG. 1. The control system includes the track-following compensator 49, and circuitry and processors that control a head-disk assembly (HDA) 52 and that provide an intelligent interface between a host 53 and the HDA for execution of read and write commands. The HDA includes the magnetic disk 34 having the plurality of concentric data tracks 36 recorded thereon. The control system may have an internal microprocessor and memory for implementing the techniques related to the invention. Program code for implementing these techniques may be stored in nonvolatile memory and transferred to volatile random access memory (RAM) for execution by the microprocessor. The microprocessor and the supporting hardware of the disk drive comprise the means for implementing the functions of the disk drive. The HDA further includes a spindle motor 56, the actuator 40, the voice coil motor (VCM) circuit 46 coupled between the actuator and a sampled servo controller of the control system (that implements the track-following compensator 49), and a preamplifier 58 coupled between the control system and the transducer head 32 on the actuator.

The magnetic media surface of the disk 34 is accessed using the head 32. The tracks 36 on the media surface may be divided into storage segments. Each storage segment typically begins with a servo sector which is followed by data sectors. The servo sector for a storage segment corresponds to an intersection with the radially-extending embedded servo wedges 38. Each servo sector includes a track address for generating a coarse position for the head, and servo bursts for generating a fine position of the head with respect to the centerline of the target track. The data sectors may include data blocks, each generally storing 512 data bytes. Each data block may be addressed using a logical block address (LBA).

The invention also may be embodied in a disk drive 30 with adaptive fundamental-frequency repeatable runout (1FRRO) learning to reduce learn time. The disk drive includes means for learning 1FRRO compensation information over a predetermined minimum number of disk revolutions; means for monitoring, after the predetermined minimum number of disk revolutions, the 1FRRO compensation information for convergence while continuing learning of the 1FRRO compensation information; means for terminating learning upon detection of convergence of the 1FRRO compensation information; and means for storing the 1FRRO compensation information for use after the disk drive ready time. The control system 47 may comprise the means for performing the recited functions.

Figure 4:
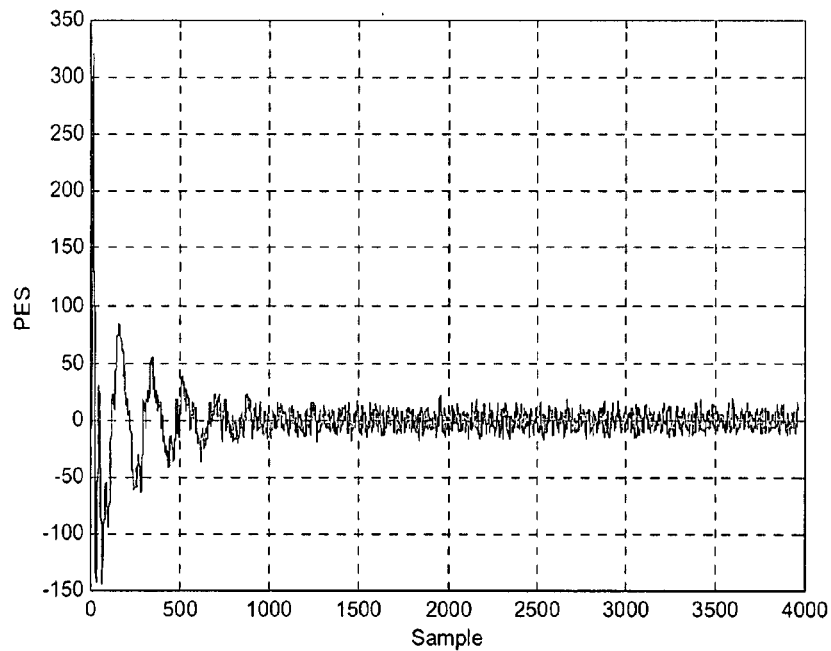
FIG. 4 is a graph of a position error signal (PES) verses servo sample showing convergence using the adaptive 1FRRO learning technique.
Figure 5:
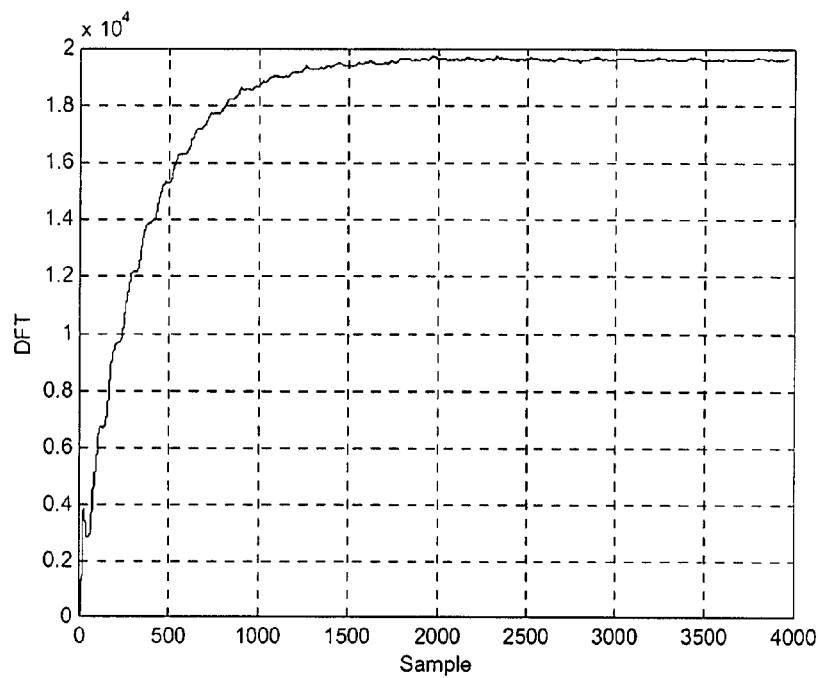
FIG. 5 is a graph of a convergence value (DFT) verses servo sample showing convergence using the adaptive 1FRRO learning technique.
Figure 6A:
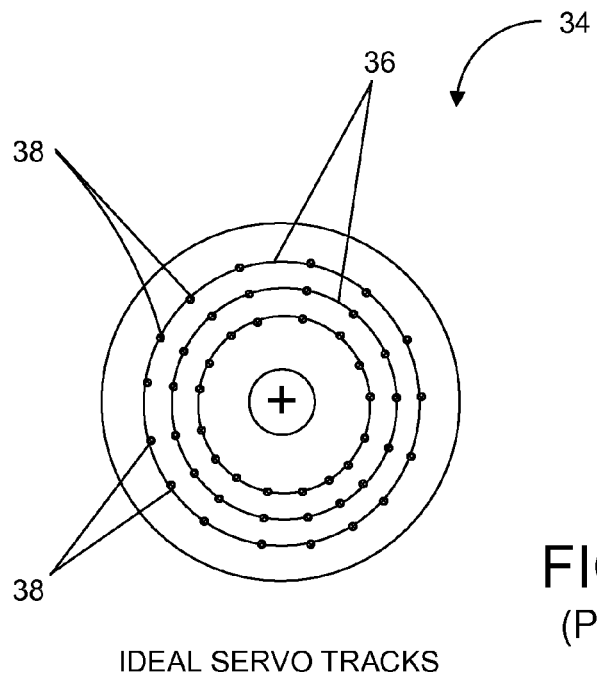
FIG. 6A is a schematic diagram illustrating ideal servo tracks on a disk of a disk drive.
Figure 6B:
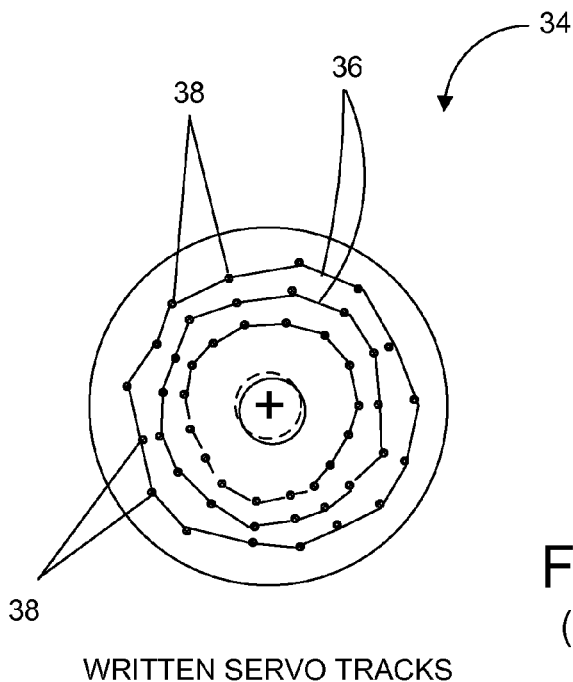
FIG. 6B is a schematic diagram illustrating a disk having written servo tracks exhibiting RRO.

With reference to FIGS. 4 and 5, the learning rate is shown by the respective graphs. In FIG. 4, the PES is plotted with respect to servo samples. The representative disk drive 30 has 180 servo wedges resulting in 180 samples per revolution. A variance in the PES decreases as the 1FRRO is learned. FIG. 5, shows convergence of the convergence value DFT within about 1200 samples, or about 7 disk revolutions. Some existing techniques use a fixed number of disk revolutions chosen based on a worst-case scenario. The present invention allows termination of the 1FRRO learning if convergence occurs in fewer disk revolutions. The present invention is particularly advantageous in a disk drive having several heads because the learning may need to be performed for each head.

The learning technique may be applied harmonic frequencies. Harmonic-frequency repeatable runout (nFRRO) compensation information may be learned and monitored for convergence. The detection of convergence of the nFRRO compensation information may include initializing convergence monitoring values Rn and In; updating the convergence monitoring values according to the formula:

$$Rn=Rn+PES*\cos(2\pi ni/N)$$

$$In=In+PES*\sin(2\pi ni/N)$$

where: i is an index representing one of N servo sectors, PES is a position error signal, and n is the harmonic number; calculating a convergence value according to the formula:

$$DFT=DFT+(R^2+I^2)^{1/2};$$

and comparing the convergence value to a threshold to detect convergence of the nFRRO compensation information. The harmonic frequency learning and convergence detection may occur independently from the fundamental frequency learning and convergence detection. Alternatively, the harmonic frequency learning and convergence detection may occur concurrently with the fundamental frequency learning and convergence detection. The learning may be terminated upon detection of convergence of the nFRRO compensation information, or upon detection of convergence of both the 1FRRO compensation information and the nFRRO compensation information.

We claim:

1. A method for adaptive fundamental-frequency repeatable runout (1FRRO) learning in a disk drive to reduce learn time, comprising:
    learning 1FRRO compensation information over a predetermined minimum number of disk revolutions;
    after the predetermined minimum number of disk revolutions, monitoring the 1FRRO compensation information for convergence while continuing learning of the 1FRRO compensation information; and
    terminating learning upon detection of convergence of the 1FRRO compensation information.

2. A method for adaptive fundamental-frequency repeatable runout (1FRRO) learning as defined in claim 1, wherein the predetermined minimum number of disk revolutions is equal to or greater than 2.

3. A method for adaptive fundamental-frequency repeatable runout (1FRRO) learning as defined in claim 2, wherein the predetermined minimum number of disk revolutions is less than 12.

4. A method for adaptive fundamental-frequency repeatable runout (1FRRO) learning as defined in claim 1, wherein the predetermined minimum number of disk revolutions is equal to 5.

5. A method for adaptive fundamental-frequency repeatable runout (1FRRO) learning as defined in claim 1, wherein the step of monitoring the 1FRRO compensation information for convergence while continuing learning of the 1FRRO compensation information comprises at least one disk revolution.

6. A method for adaptive fundamental-frequency repeatable runout (1FRRO) learning as defined in claim 1, wherein the learning steps are performed after each disk drive power-on.

7. A method for adaptive fundamental-frequency repeatable runout (1FRRO) learning as defined in claim 1, wherein the learning steps are performed after detection of a shock event.

8. A method for adaptive fundamental-frequency repeatable runout (1FRRO) learning as defined in claim 1, wherein the detection of convergence of the 1FRRO compensation information comprises:
    initializing convergence monitoring values R and I;
    updating the convergence monitoring values according to the formulas:

$$R=R+PES*\cos(2\pi i/N)$$

$$I=I+PES*\sin(2\pi i/N)$$

where:
    i is an index representing one of N servo sectors;
    PES is position error signal;
    calculating a convergence value according to the formula:

$$DFT=DFT+(R^2+I^2)^{1/2};$$

comparing the convergence value to a threshold to detect convergence of the 1FRRO compensation information.

9. A method for adaptive fundamental-frequency repeatable runout (1FRRO) learning as defined in claim 1, further comprising concurrently learning and monitoring harmonic-frequency repeatable runout (nFRRO) compensation information for convergence; and terminating learning of the nFRRO compensation information upon detection of convergence of the nFRRO compensation information.

10. A disk drive, comprising:
    a disk having a plurality of concentric data tacks defined by embedded servo wedges, the disk having some eccentricity exhibiting fundamental frequency runout (1FRRO); and
    a control system operable to:
        learn 1FRRO compensation information over a predetermined minimum number of disk revolutions;
        after the predetermined minimum number of disk revolutions, monitor the 1FRRO compensation information for convergence while continuing to learn the 1FRRO compensation information; and
        terminate learning upon detection of convergence of the 1FRRO compensation information.

11. A disk drive as defined in claim 10, wherein the predetermined minimum number of disk revolutions is equal to or greater than 2.

12. A disk drive as defined in claim 11, wherein the predetermined minimum number of disk revolutions is less than 12.

13. A disk drive as defined in claim 10, wherein the predetermined minimum number of disk revolutions is equal to 5.

14. A disk drive as defined in claim 10, wherein the control system monitors the 1FRRO compensation information for convergence while continuing to learn the 1FRRO compensation information for at least one disk revolution.

15. A disk drive as defined in claim 10, wherein the control system learns the 1FRRO compensation information after each disk drive power-on.

16. A disk drive as defined in claim 10, wherein the control system learns the 1FRRO compensation information after detection of a shock event.

17. A disk drive as defined in claim 10, wherein the detection of convergence of the 1FRRO compensation information comprises:
    initializing convergence monitoring values R and I;
    updating the convergence monitoring values according to the formulas:

$$R=R+PES*\cos(2\pi i/N)$$

$$I=I+PES*\sin(2\pi i/N)$$

where:
    i is an index representing one of N servo sectors;
    PES is position error signal;
    calculating a convergence value according to the formula:

$$DFT=DFT+(R^2+I^2)^{1/2};$$

comparing the convergence value to a threshold to detect convergence of the 1FRRO compensation information.

18. A disk drive as defined in claim 10, wherein the control system is further operatable to concurrently learn and monitor harmonic-frequency repeatable runout (nFRRO) compensation information for convergence; and terminate learning of the nFRRO compensation information upon detection of convergence of the nFRRO compensation information.

19. A disk drive with adaptive fundamental-frequency repeatable runout (1FRRO) learning to reduce learn time, comprising:
- means for learning 1FRRO compensation information over a predetermined minimum number of disk revolutions;
- means for monitoring, after the predetermined minimum number of disk revolutions, the 1FRRO compensation information for convergence while continuing learning of the 1FRRO compensation information; and
- means for terminating learning upon detection of convergence of the 1FRRO compensation information.

20. A disk drive as defined in claim 19, wherein the predetermined minimum number of disk revolutions is equal to or greater than 2.

21. A disk drive as defined in claim 20, wherein the predetermined minimum number of disk revolutions is less than 12.

22. A disk drive as defined in claim 19, wherein the predetermined minimum number of disk revolutions is equal to 5.

* * * * *